No. 672,102. Patented Apr. 16, 1901.
H. B. MORRIS.
CHAIR SEAT AND METHOD OF MAKING SAME.
(Application filed Jan. 14, 1901.)
(No Model.) 2 Sheets—Sheet 1.
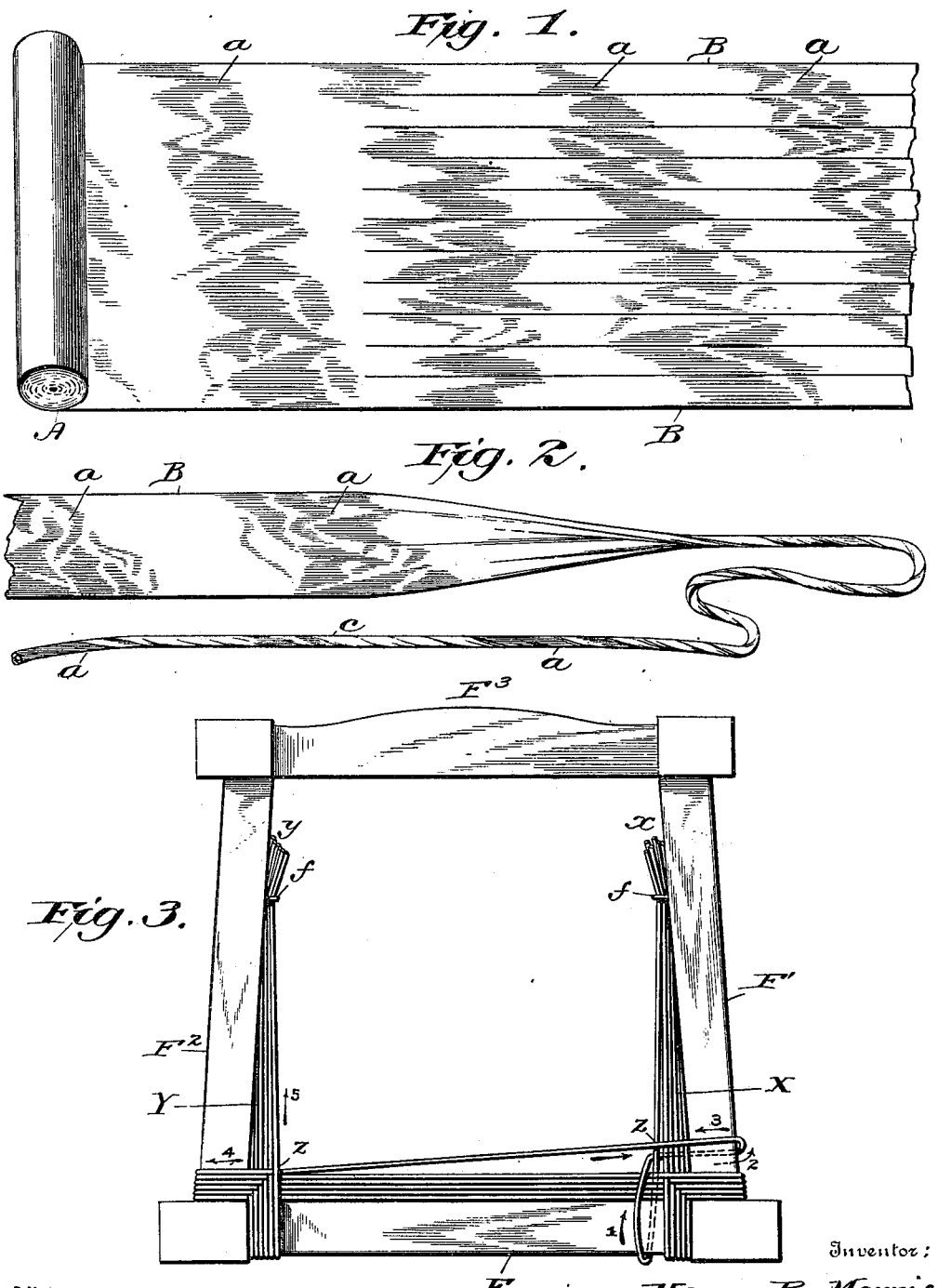

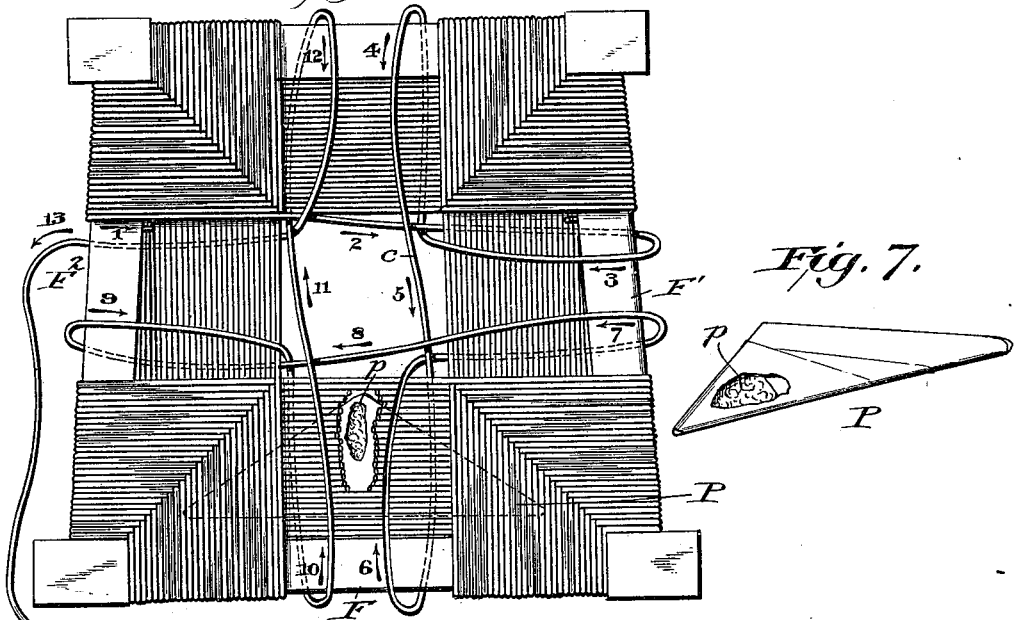
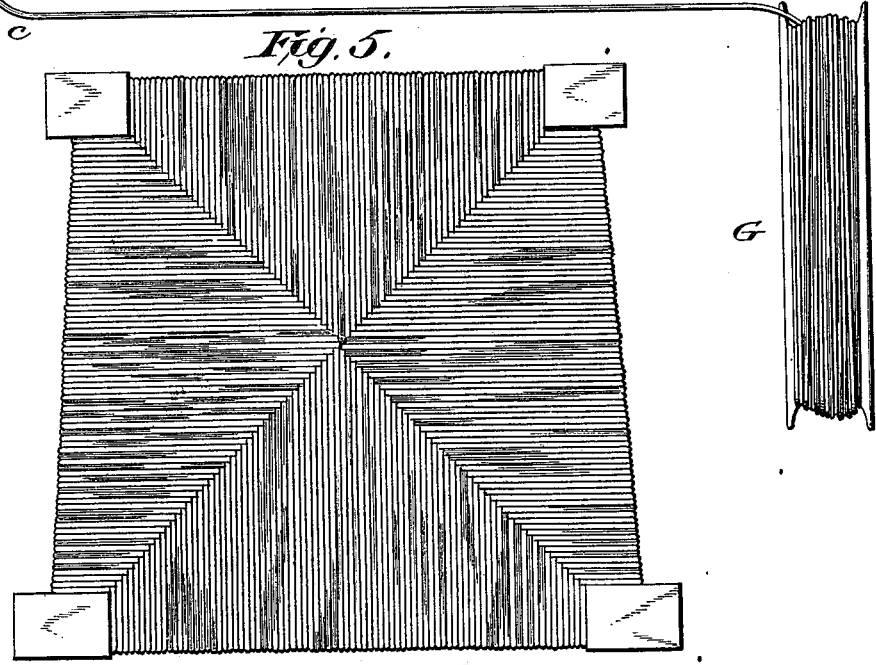
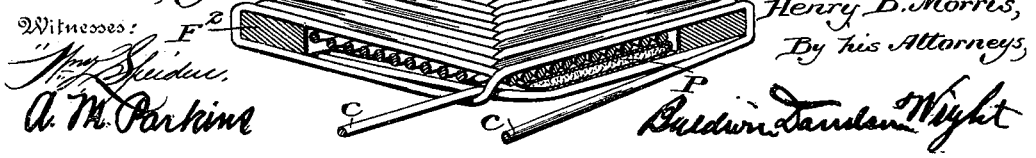

UNITED STATES PATENT OFFICE.

HENRY B. MORRIS, OF MICHIGAN CITY, INDIANA.

CHAIR-SEAT AND METHOD OF MAKING SAME.

SPECIFICATION forming part of Letters Patent No. 672,102, dated April 16, 1901.

Application filed January 14, 1901. Serial No. 43,138. (No model.)

*To all whom it may concern:*

Be it known that I, HENRY B. MORRIS, a citizen of the United States, residing in Michigan City, in the county of Laporte and State of Indiana, have invented certain new and useful Improvements in Chair-Seats and in the Method of Making Them, of which the following is a specification.

My present invention relates to the manufacture of chair-seats designed to resemble the well-known flag or rush seats which for a long time have been in extensive use.

The ordinary flag or rush seat is made from the leaves of the flag or rush or common "cattail" flag which grows in swampy ground in different parts of the United States. The leaves of this plant are usually about three feet long and can only be worked when they are damp, as the dry leaf is quite brittle. In preparing the leaves for the manufacture of chair-seats they are first split and then partially dried or cured, care being taken that they shall not be dried to such an extent as to make them brittle. The split leaves in lengths of about three feet are bunched so that when twisted they shall make a cord or rope about one-eighth of an inch thick. The chairmaker winds the twisted leaves around the chair-seat frame, while at the same time twisting the leaves into the cord or rope. The twisting and winding operations are simultaneous, and the leaves are only twisted on the upper side of the frame, while the leaves on the under side are not twisted, because this would add largely to the time and labor involved and nearly double the expense of the seat. As the leaves are comparatively short, it is necessary to splice them during the process of winding and twisting, and care is usually taken to so wind the frame of the seat that the knots and joints shall not appear on the upper side of the seat, but shall always be located on the under side thereof. These chair-seats preserve their attractive appearance for a time, but afterward become dry and brittle, lose their pleasing color, and are apt to get torn or broken. The most serious defect, however, lies in the fact that inasmuch as the leaves are not twisted on the under side of the seat this side of the seat is not so compact and dust and insects can freely enter between the strands, and as the leaves are untwisted the long fibers are apt to be broken off. The seat made of the natural flag is now becoming scarce, and the price of the once popular flag seats has increased.

The object of my invention is to provide a substitute for the rush or flag seat which shall not only resemble in appearance seats made from the natural flag, but shall also possess superior qualities.

In carrying out my invention I employ a cord or rope made of paper treated in a novel manner, hereinafter described, so as to resemble the rope or cord made of flags. By employing paper I am enabled to make a continuous rope or cord or one of indefinite length, which may be wound upon the frame of the chair-seat continuously without being spliced or knotted during the winding process, the under side, as well as the upper side, of the seat being composed of twisted strands, and therefore being close and compact on both sides and proof against the entrance of dust or insects. In preparing the paper cord for this purpose I preferably proceed as follows: I take good Manila paper and splash it at various point with dye, preferably a light green dye, in order to give it a greenish tinge in spots resembling flag. This paper thus treated is then slit into ribbons of suitable width—say from one and a quarter to two and a quarter inches wide—and these ribbons are then twisted to form ropes or cords about one-eighth of an inch thick. The width of the ribbons will depend upon the weight of the paper. A strip of sixty-pound paper one and one-half inches wide will make a suitable cord one-eighth of an inch thick; but of course the width or diameter of the cord may be varied *ad libitum*. The chair-seat frame is covered with the twisted-paper cord thus made in the manner hereinafter described. After the frame is completely covered I preferably apply freely a very thin varnish, consisting, preferably, of a good quality of furniture-varnish diluted with about four times its bulk of turpentine or benzine. This is allowed to soak through the paper covering, thereby rendering it waterproof and strong. After the paper thus treated is dry I preferably rub off with sandpaper any rough places which may appear on the surface. Then I apply another coat of varnish, and, if desirable, subsequent coats are applied until the surfaces are well coated and present an appearance resembling the ordinary rush or flag.

There are other features of the process and other characteristics of the chair-seat made in accordance with my invention, which will be hereinafter referred to.

I have illustrated in the accompanying drawings a chair-seat made in accordance with my present invention and have also indicated the method of making it.

Figure 1 is a plan view of a roll of paper partially slit or divided into strips and colored for the purpose of imitating flag. Fig. 2 illustrates the manner in which the strips of colored paper are twisted into cords. Fig. 3 is a plan view of a chair-seat frame with a number of strands of paper cord applied to prepare the frame for the main winding. Fig. 4 is a plan view of a chair-seat partially completed, the manner of winding the continuous cord being indicated by the loose turns of the cord. Fig. 5 is a plan view of the completed seat. Fig. 6 is a local section showing the manner in which the stuffing or packing is introduced. Fig. 7 is a perspective view of one of the packing-pads.

For making the paper cord I use good light-brown Manila paper A, and as it is being unwound I apply a light-green dye by means of a brush or sponge or other suitable tool, the dye being preferably arranged as indicated at $a$ in Fig. 1, so that when the paper is twisted it shall resemble the natural flag. After the paper is colored it is cut into strips B of suitable width to form cords of proper thickness.

Fig. 2 indicates the manner in which the strips are twisted. Of course in manufacturing on a large scale suitable machinery is employed for cutting the roll of paper into strips, and these strips are usually wound on reels, from which they pass to suitable twisting apparatus. It is deemed unnecessary to show or describe the apparatus here. The twisting operation is so performed as to cause the twisted strands to resemble the twisted strands of flag usually employed. The strands thus twisted are in suitable condition for being wound upon chair-seat frames. They should be wound or applied to the frame before they are varnished, and preferably I moisten or dampen the strands before they are applied to the frame, because in this way I find the strands may be made to lie more closely together and will flatten down where they cross each other and make a more compact fabric.

Chair-seat frames are usually wider at the front than at the back, and if the frame is covered by winding it with a continuous cord the winding will not be close and compact. In order to obviate this objection, I first do some preliminary winding, as indicated in Fig. 3—that is, a few strands, say a half-dozen, as indicated, are wound at the front of the frame—so as to fill the triangular spaces X and Y. This preliminary winding will produce a substantially square or rectangular opening in the frame, which may be covered by winding the cord continuously, in the manner hereinafter described. The number of extra strands needed to make the opening rectangular will depend, of course, upon the shape of the seat. Some seats require less than others, being of a form more nearly rectangular.

It will be observed by reference to Fig. 3 that the ends of the cords are secured to the side pieces of the frame by means of staples $f$; but other securing devices might be employed, the main feature of this part of the invention being that the irregular opening in the chair-seat is made regular or square by means of a few strands, so that the main winding may be continuously performed and a compact and close fabric may be obtained. The strands which appear on the surfaces in Fig. 3 will also appear in the finished seat. Each strand, it will be observed, starts from one staple, as at $x$, passes beneath the front piece F of the frame, is then turned upwardly, as indicated by the arrow 1, and passes over the top of the frame and under that portion of the strand leading from the point $x$. It is then turned at right angles and carried under the side piece F' of the frame, as indicated by the arrow 2, then upwardly and over the top of the side piece, as indicated by arrow 3, and then across to the opposite side piece $F^2$ over the top of the side piece, as indicated by the arrow 4. It then passes under the side piece $F^2$, is bent at right angles, and passes under the front piece F, then over the front piece, and then to the staple at $y$, as indicated by the arrow 5. In this way the opening in the chair-seat is made rectangular in form, and the surfaces of the seat are partially formed. Those portions of the strands leading from the points $z$ to the staples will not appear on the upper and lower surfaces of the seat, but will be concealed. After the frame is thus prepared the main winding is proceeded with. As before stated, the paper cord is wound before it is varnished, as a varnished cord would be too hard and stiff for winding. An unvarnished cord, which is soft and pliable, can be wound closely and uniformly, and in order to increase the facility with which it can be wound I preferably moisten or dampen the cord preliminary to winding it.

The manner in which the main winding is performed is indicated in Fig. 4. In covering the frame after it has been prepared, as indicated in Fig. 3, a single continuous cord may be used. The winding is commenced at one of the corners of the squared frame and may be proceeded with in the manner indicated in Fig. 4. The numbered arrows clearly show the method of winding and it need not be described.

It will be observed that where the cord $c$ crosses itself it is interlocked in such manner as to tie the folds or convolutions together, making a secure fabric. A frame wound in this way produces three different thicknesses or layers, as indicated in Fig. 4 and also in Fig. 6.

After the seat is partially wound—say about two-thirds wound, as indicated in Fig. 4—I introduce between the middle and bottom layers pads P, such as indicated in Fig. 7. These may be composed of excelsior $p$, covered with paper. They are preferably triangular in shape, as indicated in Figs. 4 and 7, and they serve to increase the thickness of the seat and prevent it from flattening or sagging. It is important that the pads should be introduced between the middle and lower layers in order that any loose packing material which may protrude from the pads may not appear on the surface of the seat. Preferably four pads are employed, all located in a similar manner to that indicated in Fig. 4. The paper cord may be wound on a reel G during the first part of the winding. The last part of the winding is done without a reel, and when the end of the winding is reached the end of the cord is tucked in at the center. The frame thus covered will have the appearance of the seat indicated in Fig. 5. I next preferably saturate the paper with waterproofing material. This is done by applying a very thin waterproofing material consisting, preferably, of a good quality of furniture varnish diluted with about four times its bulk of turpentine or benzine. This is allowed to saturate or soak into the paper on both sides of the seat. After this hardens the seat may be smoothed down by rubbing it with sandpaper to remove any rough places. Additional coats of varnish may then be applied, which may be thin like that first used or somewhat thicker. The varnish is applied until the desired surfaces are obtained, with special reference to their resemblance to ordinary seats made of natural flag or rush. The advantages of chair-seats made in this way will readily be perceived from the foregoing description. The paper cord varnished and soaked with waterproofing material in the manner described is very hard and durable and will last for many years. The seat is closely wound on both top and bottom, making it proof against the entrance of dust and insects. The winding is free from knots and joints, none whatever appearing on either the upper or lower surfaces, and hence there is no danger of the cords breaking loose at any point. The cord will not shrink nor expand, but will maintain a uniform condition at all times. The seat has the appearance of a seat made of natural flag or rush, and yet does not have the objectionable features of flag seats.

The method of coloring the paper to resemble rush or flag herein described—viz., by first dyeing the paper at intervals and then twisting it into a cord—I regard as the most convenient one, but the cord might instead be stained or dyed after twisting it, or, indeed, after it has been wound on a seat-frame; but to properly color the twisted cord is much more difficult and expensive, requiring much artistic skill. I regard this, however, as a mere modification of my invention, which in this connection consists in so coloring the material that as it lies in the chair-seat it shall resemble the irregular coloring of the natural flag or rush.

I claim as my invention—

1. The method herein described, of making a chair-seat, which consists in first applying dye to paper in such manner as to resemble the greenish color in the natural flag or rush, then twisting the paper into cords, then winding the paper cord while it is still soft upon a seat-frame, then soaking the paper seat thus formed with waterproofing material, and then applying a finishing coat of varnish thereto.

2. The method herein described, of making a chair-seat, which consists in twisting and coloring a strip of paper to resemble natural flag, moistening the paper cord thus made, and winding it while soft upon the seat-frame.

3. A chair-seat, consisting of a frame having an opening wider at the front than at the back, strands of twisted paper wound upon the frame to make the opening therein square or rectangular, devices for securing the ends of the paper strands to the frame, and a covering for the frame consisting of a continuous twisted-paper cord wound upon the frame and completely closing the opening in the frame inside the strands first applied.

4. A chair-seat, comprising a frame wound with twisted-paper cord which is colored and has its convolutions wound closely together and forming three layers, and pads of packing material interposed between the layers, substantially as described.

In testimony whereof I have hereunto subscribed my name.

HENRY B. MORRIS.

Witnesses:
OLIVE SNELL,
ARTHUR N. GITTINGS.